US00RE35968E

United States Patent [19]

Prerost

[11] E Patent Number: Re. 35,968

[45] Reissued Date of Patent: Nov. 24, 1998

[54] CARD GAME

[75] Inventor: Phillip P. Prerost, Las Vegas, Nev.

[73] Assignee: Carl Duty, Las Vegas, Nev.

[21] Appl. No.: 833,852

[22] Filed: Apr. 10, 1997

Related U.S. Patent Documents

Reissue of:

[64] Patent No.: 5,407,209
Issued: Apr. 18, 1995
Appl. No.: 238,468
Filed: May 5, 1994

[51] Int. Cl.[6] ..... A63F 1/00

[52] U.S. Cl. ..... 273/292

[58] Field of Search ..... 273/292, 274, 273/303

[56] References Cited

U.S. PATENT DOCUMENTS

| | | | |
|---|---|---|---|
| 3,796,433 | 3/1974 | Fraley et al. | 273/138 |
| 4,397,469 | 8/1983 | Carter, III | 273/149 |
| 5,013,049 | 5/1991 | Tomaszewski | 273/292 |
| 5,072,946 | 12/1991 | Miller | 273/292 |
| 5,154,429 | 10/1992 | LeVasseur | 273/292 |
| 5,174,579 | 12/1992 | Griffiths | 273/292 |
| 5,257,810 | 11/1993 | Schorr et al. | 273/292 |
| 5,265,882 | 11/1993 | Malek | 273/292 |
| 5,275,415 | 1/1994 | Wisted | 273/274 |
| 5,275,416 | 1/1994 | Schorr et al. | 273/292 |
| 5,288,081 | 2/1994 | Breeding | 273/292 |
| 5,320,356 | 6/1994 | Cauda | 273/292 |
| 5,322,295 | 6/1994 | Cabot et al. | 273/292 |
| 5,328,189 | 7/1994 | Malek | 273/292 |
| 5,364,105 | 11/1994 | Jones | 273/292 |
| 5,368,305 | 11/1994 | Rodda et al. | 273/292 |
| 5,390,934 | 2/1995 | Grassa | 273/292 |
| 5,395,119 | 3/1995 | Jacob et al. | 273/274 |
| 5,395,120 | 3/1995 | Malek | 273/292 |
| 5,397,128 | 3/1995 | Hesse et al. | 273/292 |
| 5,407,209 | 4/1995 | Prerost | 273/292 |

FOREIGN PATENT DOCUMENTS

| | | | |
|---|---|---|---|
| 92/16269 | 10/1992 | WIPO | A63F 1/00 |

OTHER PUBLICATIONS

Scarne, "Scarne's Encyclopedia of Games", 1973, Harper & Row, p. 286.

"Bacc–Jack", 1995, Casino Gaming Concepts, Inc.

Frey, "According to Hoyle", Jul. 1970, Hawthorn Books, pp. 205–215.

*Primary Examiner*—William E. Stoll
*Attorney, Agent, or Firm*—D'Alessandro & Ritchie

[57] ABSTRACT

An improved card game is provided. In particular, the present invention relates to a modification and improvement to *card games where a player tries to reach one or more specified card count target values without exceeding the stated target value, such as* the well-known card game of blackjack or 21. A player is dealt first and second cards after placing an original bet, and then elects to stand or take an additional third card. If a third card is taken, the player is given the option of keeping the card, or replacing the card. If the third card is replaced, an additional wager is placed by the player, and a replacement to the third card is given. The player then elects to stand or take additional cards. After the player has taken all desired cards, the dealer's hand and player's hand are compared to determine a winner.

32 Claims, 1 Drawing Sheet

CARD GAME

Matter enclosed in heavy brackets [ ] appears in the original patent but forms no part of this reissue specification; matter printed in italics indicates the additions made by reissue.

FIELD OF THE INVENTION

The present invention relates to a card game. In particular, the present invention relates to [a variation of the game of "21"] *variations of games such as –21" and other games where players try to reach a target value without exceeding it.*

BACKGROUND OF THE INVENTION

By far the most popular casino card game is "Blackjack" or "21", which is typically played at a semi-circular table with a maximum of six players sitting around the arcuate periphery of the table. These players play against the dealer, who typically stands behind the table. Although the game of "21" is a simple game in which each player attempts to get a total card value of as close as possible to 21 without exceeding 21, many millions of dollars per day are wagered on this game in casinos throughout the United States. Despite the fact that this game has been played daily for decades, its popularity persists.

In the typical "21" game, the game first begins by each player "anteing in" or placing an original bet. Each player so wagering is then entitled to first and second cards, as is the dealer. At that time, the dealer examines his or her cards in order to determine whether the house has a "21", in which case the game is over and the house collects each of the original bets unless [one the] *a* player has a 21 him or herself.

In the event that the dealer does not have a "21", each player examines his or her cards and elects whether to take a third card, called a "hit" card. If the player stands, the outcome of the game will result in a comparison of the player's two cards with the dealer's hand. If the player elects to take a hit card, however, the dealer deals a third card to the player.

Upon being dealt this third card, the player must determine whether the hand is a bust, meaning that the player has automatically lost because the card count is worth over 21, or whether to stand or take an additional hit card. If the player stands, the hand, now comprising three cards, is compared to the dealer's ultimate hand in order to determine the winner. If the player elects to take another hit card, this card is dealt to the player and the above process is repeated. This process applies to the dealer, and of course, and if the dealer "busts", then each of the players who are not out of the game are paid an amount equal to their bet.

Upon the dealing of all cards, the winner of the game is determined by comparing the hands of those players who remain in the game to the hand of the dealer. As between each player's hand and the dealer's hand, the hand which is closest to 21 is declared the winner.

In the event that the player and dealer have the same total, normally the hand is declared a "push" and neither the house nor the player wins. In the event that the player wins on a two card count of 21, the payout is normally 1.5 to 1. If the player wins with a hand having a card count of less than 21 or a greater than two card count of 21, the player is paid 1 to 1. Of course, if the player loses, his original bet and any subsequent bet are lost to the house.

*In addition to "21", there are a variety of other games well known to those of ordinary skill in the art where the goal of the player is to reach a specified target value. Games like Baccarat and Chemin-de-fer have a target value of nine, while a number of games have a target value of 22 (See, e.g., U.S. Pat. Nos. 5,072,946 to Miller and 5,275,415 to Wisted). There are even games like 7-27, where the goal is to get as close as possible to either of two target values, i.e., 7 and 27. All of these games share the same structure, in that the player may choose to add one or more additional cards to his or her hand, or stop at any point. They also involve comparing one player's hand to another hand to see which hand is the winning hand.*

While "21" [offers] *and these other games offer* great excitement to the player, it has been desired to offer the player additional opportunities to take or reject cards. Further, it has been desired to increase the opportunities for wagering, and thus increase the possible payoff to the player, enhancing the excitement of the game.

SUMMARY OF THE INVENTION

In order to provide more excitement to the game of "21" *and other games where players try to reach a target value without exceeding it,* and to provide the player with more control and opportunity to win, a modification to [the standard game of "21"] *such games* is provided. In accordance with this improved version of [the game] *such games* of the present invention, a player is allowed to obtain, under certain circumstances, a replacement card to a dealt card.

In particular, once a player has been dealt [first and second cards] *the starting cards*, the player must elect to stand or take [a third card] *an additional card*. In accordance with the present card game, if the player is dissatisfied with the [third card] *next card* which is dealt, that player may purchase a replacement card to [the third card] *this card* upon payment or placement of an additional wager, and in a preferred embodiment, yielding "pushes".

In the preferred embodiment, the player must then elect to stand, or take additional cards, which may not be replaced. The game then continues in accordance with the rules of [a regular "21" game] *the regular game.*

In the event that a player wins a hand in which a replacement card has been, in effect, purchased, that player is entitled to an additional payment. This payment is preferably an amount equal to the original bet and the additional wager.

Further objects, features, and advantages of the present invention will become apparent from the detailed description of the drawings which follows, when considered with the attached figures.

DETAILED DESCRIPTION OF THE PREFERRED EMBODIMENT

Figure 1:
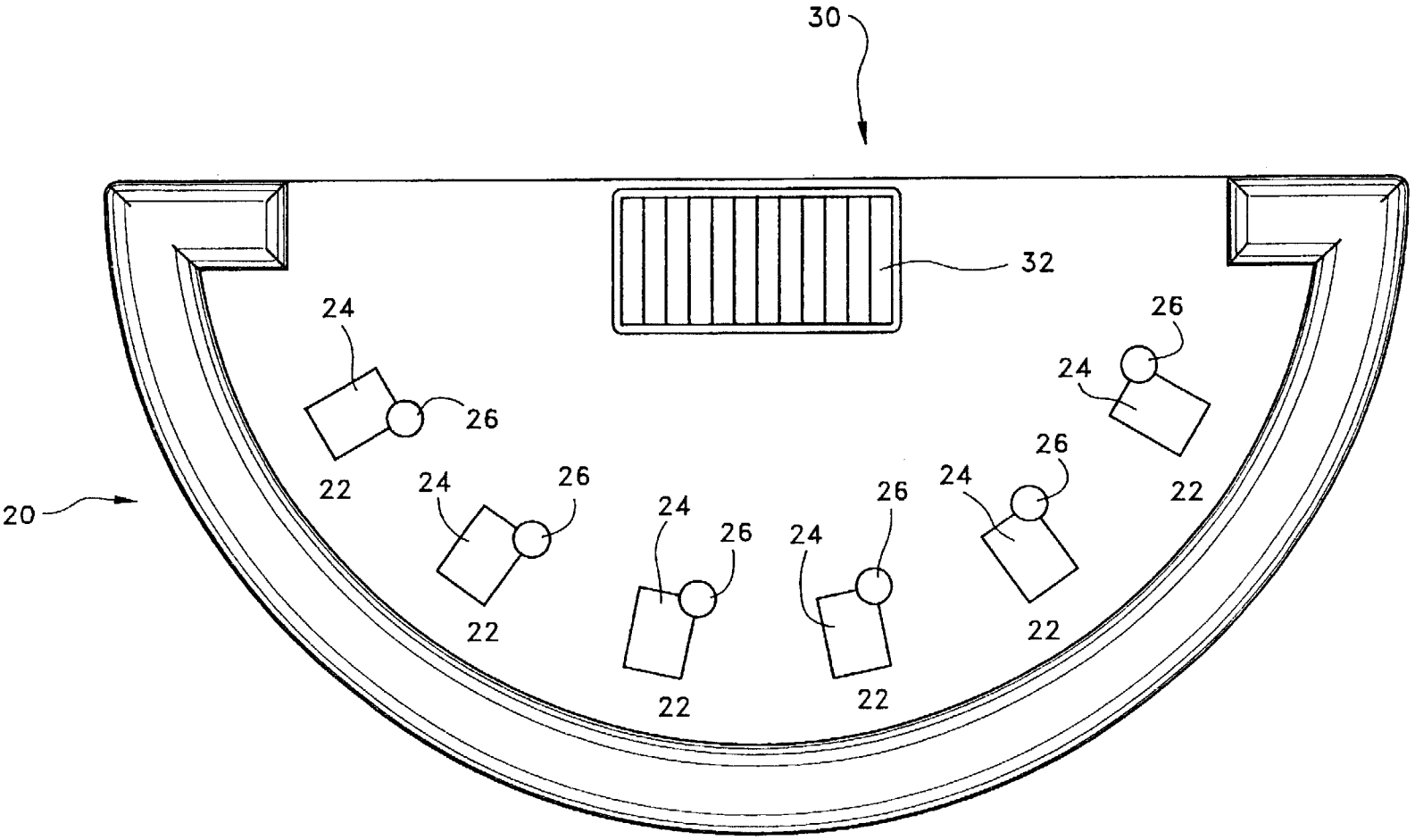
FIG. 1 illustrates a game layout which may be used with the preferred embodiment card game of the present invention.

The improved card game of the present invention will be described with reference to the game layout 20 shown in FIG. 1. The layout 20 is preferably mounted for use on the top of a conventional gaming table (not shown) positioned at a suitable location in a casino. Playing locations 22 are provided for each player, with the maximum number of locations normally not exceeding six. Each playing location 22 has a designated area 24 for the player to place the dealt cards and original bet, and designated area 26 for the placement of a second chance "bet" or "wager", which will be described in more detail below.

A dealer's location 30 is provided opposite the playing locations 22 and is preferably adjacent to a chip rack 32. The chip rack 32 is of a conventional design used to hold chips or other gaming tokens. The dealer uses the chip rack 22 to store the gaming tokens that belong to the house. When a player loses his wager to the house, the gaming tokens won by the house are stored in the chip rack 32. When a player wins his or her wager from the house, the player is paid from the gaming tokens stored in the chip rack 22.

Standard playing cards (52 cards per deck) are used to play the game. Any number of decks may be used, but in one preferred embodiment, six decks of cards are shuffled together for use. Once the players who wish to play have placed their original bet, or first bet means, in the bet area 24, the dealer deals first and second cards (i.e., a pair of cards) to each player and to him or herself. As to the players, these two cards are normally dealt face up, although, depending on the number of decks being played and house policy, it is possible to deal either or both of the cards face down. As to the dealer, it is conventional for one card to be dealt face up and one face down.

In the event that the dealer's face-up card is a ten count or an ace, most house rules require the dealer to immediately check for a 21. If the dealer has been dealt a 21, all players also having a two card count of 21 must so declare, and as to these players, the hand is a push. As to those players having a hand less than 21, the hand is lost by them and the house collects their original bet.

In the event that the dealer's face-up card is not a ten count or ace, the game continues by the first player examining his or her cards and electing whether to "stand" or take additional cards. By "standing" the player simply elects to take no more cards. In the event that the player wishes to take additional cards in order to come as close to a count of 21 as possible, the player may take a third card, also called a "hit" card. This card is given by the dealer to the player, who must then again elect to stand or take an additional card. Of course, in the event that the "hit" card causes the player to "bust" or have a card count of over 21, the player automatically loses and is no longer in the game. In such event, the house collects any wager made by the player.

The player may continue to take a fourth hit card, or subsequent additional hit cards, until such time as the player elects to stand, or the player busts. At that time, the next player is entitled to the same set of elections.

Once each of the players have completed[,] their elections or have busted and left the game, the dealer plays the house hand. Normally, if the dealer's hand is over 17, house rules require the dealer to stay. On the other hand, if the dealer's hand is less than 17 (i.e., 16 or less) or is a "soft" 17 (where one card is an ace) then the dealer must take additional cards until such time as the dealer's hand is 17 or greater, or the dealer's hand is a bust.

If the dealer busts, all players who are still in the game are winners. On the other hand, if the dealer reaches a stay hand (normally a card count of 17–21), this hand is compared with each hand of each player in order to determine the winner. Normally, if the dealer and a player have identical card counts, the hand is a "push" and neither the house nor the player wins. On the other hand, if the card total of a player is greater than that of the dealer, that hand is a winner. Of course, if the card count of the player is less than the dealer, the house wins the hand.

Normally, in the event that the player wins the hand by having a two card count of 21, the player is paid an amount equal to 1.5 times the wager (a 1.5 to 1 payout). In the event that the player wins the hand with a card count of something less than 21 or a greater than two card count of 21, the player is normally paid an amount equal to the wager. Lastly, if the player loses the hand, the house collects the amount wagered by the player.

Several variations to the game of "21" exist, which may also apply to the present invention, as described in more detail below. In particular, sometimes a player is offered the chance to "surrender" his or her cards when his or her turn to elect to stand or take additional cards arises. In this instance, the player is allowed to drop out of the game, if he or she so elects, normally in exchange for one-half of the original bet.

When a player is dealt a pair of cards, the player is often allowed to "split" these cards. In that instance, the player provides a second bet equal to the original bet, and the dealer deals two more cards to the player, one each for each of the split first and second cards, thus creating for the player two hands which the player is allowed to play.

If a player's first two cards have a card count total of 11 (and sometimes 9 or 10 depending on the variation of the game), the player is often allowed to double his or her bet and take a single additional card. This process is called "doubling down". In that instance, the player simply enters an additional bet, normally equal to the original bet, and receives a single additional card. This card is normally dealt face down, and the player is not allowed to view it until the entire hand has been played.

Lastly, in one variation of the game, "insurance" may be purchased by a player. In this variation, if the dealer's up card is an ace, a player is entitled to place an insurance bet. If the dealer looks at the down card and declares a 21, then the player who has placed the insurance bet is entitled to a 2 to 1 payout. If the dealer's down card is not a 10 count and thus the dealer does not have a 21 count, then the player loses the insurance bet.

Of course, other variations of the standard game of "21" *and other games where players try to reach a target value without exceeding it* are known, and as one skilled in the art will recognize, may be incorporated into the improved version of the game as described in detail below.

The card game of the present invention is a modification, and improvement to, the above-described standard or regular "21" card game *and other games where players try to reach a target value without exceeding it*. In particular, the game of the present invention deviates primarily from the above-described game by allowing a player to obtain replacement cards to one or more dealt cards.

In particular, as described in detail above, the player is dealt first and second cards to begin the game. At the particular player's turn, the player must elect to stand or take an additional third card or "hit" card.

In accordance with the game of the present invention, if the player is not satisfied with this third card, the player may elect to exchange it or replace it with another card, for the payment of an additional wager or bet means, preferably equal to the original bet. Of course, as with the original bet, these second bet means may comprise tokens, money or any type of wagered item.

The election to take a replacement card will normally occur when the player receives a third card and discovers that it does little to improve his or her card count. In that event, the player may, for an additional sum wagered, discard the third card and request that a fourth, or substitute third card be dealt in its place.

After that time, the game proceeds just as a regular game of "21" *or other game where players try to reach a target value without exceeding it.* In particular, it is contemplated that if the player receives the fourth or exchanged card, the player must then elect whether to stand or take subsequent additional hit cards. After each player has either gone bust or has taken all cards desired, the dealer plays his or her hand out, and the winners and losers are declared.

In accordance with [the] *a* preferred version of playing this modified version of the "21" game, the following rules are preferably, but not necessarily, employed. First, if upon receipt of a third card, the players card count is over 21, then the player has busted and the player may not obtain a replacement to the third card.

Second, if the player has elected to exchange the third card for the additional wager, and there is a tie card count between the dealer and the player, the player loses. In effect, there are no "pushes" or draws, the dealer winning all tie card counts. Thus, in electing to exchange the first hit card, the player has bargained away the right to receive any bet back in the event of a tie.

As stated above, it is often the case that the variation of the game being played allows the player to split hands or to "double down" after the first two cards have been dealt. In a preferred embodiment of the modified card game described above, the player is not allowed to exchange a third card if the player has already split the first and second cards or placed a double bet. In essence, this means that players who have either split or doubled-down simply play the standard "21" game.

In one preferred embodiment, players are not allowed to "surrender" their first and second cards. Because, in accordance with the present invention, players are allowed to increase their chances of obtaining a good hand by getting two shots at a good third card, the elimination of the surrender option keeps more players in the game, while not forcing them to keep hands which are otherwise unlikely to be winners. The "surrender" option is not normally used in commercial casino play.

It is further preferred that the players still be able to purchase insurance, as this is an aspect of the game which is, in essence, unrelated to the option of purchasing a replacement third card.

In one variation in which the dealer does not inspect his hole or down card when a 10 count card is face up, a preferred form of playing the game of the present invention is also described. In particular, in such an instance, the dealer may have an ace as the face down card, and not declare a card count of 21 until after all players have accepted additional cards or dropped out. In that case, it is preferred that a player who has placed a second bet or wager and received a replacement third card, and who loses the game when the dealer does in fact have a 21, lose only the original bet and not the second bet.

As noted above, the player is required to post an additional wager if the player wishes to exchange the third card for a new card. This amount may be a preset amount, or alternatively, may be a preset minimum which allows the player to bet an amount greater than the minimum if the player feels confident that the replacement card will result in a winning hand.

Further, although in the embodiment described above, it is preferred that the player be able to exchange only one card, it is possible to vary the cards which are exchanged. For example, it is possible to allow the player to, for another sum, for example a greater sum, exchange or replace even the card which was received as the initial replacement card. Further, it is possible to allow the player to exchange subsequent additional cards. For example, if the player were to accept the third card or replacement thereto, such that the player had a hand comprising three cards, and the player wished to take a fourth card (or other subsequent cards, as the case may be), the player might be allowed to replace the fourth card for the payment of an additional wager.

In fact, the player might be allowed to replace any single dealt card (other than the first and second cards) at any time, upon the payment of the additional amount. The player might also be able to exchange more than one card, upon the payment of higher and higher additional bets.

Further, in accordance with the preferred embodiment of the improved card game described above, there is a revised schedule of payment for winners and losers. First, as with the regular version of "21" it is desired that an insurance bet which is won be paid out at 2 to 1, while a losing insurance bet be collected by the house.

A winning two card count of 21 by a player is normally entitled to a payout of 1.5 to 1. In the event a player has placed the additional wager and taken the replacement third card, in the preferred embodiment of the game, if the player and dealer both have a card count of 21, there are no pushes, and the player loses his or her bet (original bet plus additional wager or bet). If, on the other hand, the player has not taken the replacement card, the player is entitled to a push, and if the player and dealer both have a 21 count, a tie is declared and the player receives back his or her original bet.

If the player wins the hand on a non-21 count or 21 count on more than two cards, either having taken a replacement card or not, the player is entitled to a 1 to 1 payout on both the original bet, and if placed, the additional wager to obtain the replacement card. The above payout schedule may be modified in any of a variety of forms, and the version described above is merely the preferred payout schedule.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method of playing a game of twenty-one, comprising the steps of:

(a) a player placing a first bet;

(b) a dealer dealing first and second cards to the player and the dealer;

(c) the player examining the first and second cards and electing to stand or take a third card;

(d) if the player takes a third card, the player examining the hand including the third card and electing whether to accept or reject said third card;

(e) if the player elects to reject the third card, the player betting a second bet and receiving a replacement card for the rejected third card;

(f) the player electing whether to take subsequent additional cards or to stand; and (g) comparing the player's hand to the dealer's hand in order to determine the winner of the game.

2. The method of claim 1, wherein when said player accepts said third card and then elects to take a fourth card, said player may elect to reject said fourth card and receive a fifth card in replacement of the fourth card upon the player betting a second bet.

3. The method of claims 1 or 2, wherein said first bet and second bet are equal.

4. The method of claim 2, wherein said player is not allowed to reject said fourth card if said fourth card, in combination with said first, second, and third cards, creates a card count of over 21.

5. The method of claim 1, wherein when said player elects to reject said third card and receives a fourth card in replacement thereof, and elects to accept a fifth card, said player may elect to reject said fifth card and obtain a replacement thereof upon payment of a third bet.

6. The method of claim 1, 2, or 5, wherein if said player elects to receive a replacement card, a player will thereafter lose all bets made by the player in the event of a tie card count with the dealer.

7. The method of claim 5, wherein said first bet, second bet, and third bet are equal.

8. The method of claim 5, wherein said player is not allowed to reject said fifth card if said fifth card, in combination with said first, second, and third cards, create a card count of over 21.

9. The method of claim 1, wherein said player is not allowed to reject said third card if said third card, in combination with said first and second cards, creates a card count of over 21.

10. The method of claim 1, further including the step of allowing said player to double the first bet after said first and second cards have been dealt, and wherein in said player doubles the first bet, said player is not allowed to reject any card.

11. The method of claim 1, further including the step of allowing said player to split said first and second cards if they are of the same count before said player elects to take a third card.

12. The method of claim 11, wherein if said player elects to split said first and second cards, said player is not allowed to reject a third card which is taken.

13. The method of claim 1, further including the step of allowing a player to place an insurance bet after said cards have been dealt.

14. The method of claim 1, further including the step of allowing said player to surrender said first and second cards for at least a portion of said first bet.

15. The method of claim 1, wherein the dealer wins the game in the event the dealer's card count is equal to the card count of the player, if the player has taken a replacement card.

16. The method of claim 1, further including the step of paying to the player an amount equal to the first bet and any second bet placed in the event the player's card count is greater than the card count of the dealer or in the event the dealer has busted.

17. A method of playing a card game, comprising the steps of:

(a) obtaining at least one standard deck of 52 playing cards;

(b) the player placing a first bet;

(c) a dealer dealing first and second cards face-up to the player, and dealing first and second cards to the dealer, one of which is dealt face-up and one of which is dealt face-down;

(d) the dealer checking for a card count of 21 in the event the dealer's face-up card is a 10 count or ace;

(e) the player electing whether to purchase insurance if the dealer's face-up card is a 10 count or ace and the player placing an insurance bet in the event the player so wishes to purchase insurance;

(f) the player being paid two times the insurance bet amount in the [even] *event* the dealer has a card count of 21 if insurance has been purchased and the dealer collecting the insurance bet in the event the dealer does not have a card count of 21;

(g) the player electing to take a third card or stand;

(h) if the player takes a third card, the player being declared a loser if the card count of the first, second and third cards is greater than 21, and if not, the player electing to accept said third card or reject said third card and receive a replacement card upon placing a second bet;

(i) if the player receives said replacement card, said player forfeiting the right to receive the first bet and second bet back in the event of a tie between the player and dealer;

(j) the player electing to take subsequent additional cards or to stand;

(k) comparing the player's hand to the dealer's hand in order to determine the winner of the game; and (l) paying the player an amount equal to the first bet means and any second bet means if the player wins the hand, and the dealer collecting the first bet means and any second bet means from the player if the dealer wins the hand.

18. The method of claim 17, wherein said first bet and said second bet are equal.

19. The method of claim 17, wherein if said dealer does not check under a 10 count card after the first and second cards are dealt, and said player elects to reject a card and places a second bet means, said dealer does not collect said second bet in the event said dealer has a two card count of 21.

20. The method of claim 17, wherein when said player accepts said third card and then elects to take a fourth card, said player may elect to reject said fourth card and receive a fifth card in replacement thereof upon the player betting a second bet.

*21. A method of playing a game, said method comprising the steps of:*

*(a) a player placing a first bet;*

*(b) a dealer dealing a predetermined number of starting cards each to said player and to said dealer;*

*(c) said player examining said starting cards and electing to stand or take an additional card;*

*(d) if said player elects to take an additional card, said player examining said starting cards and said additional card and then electing whether to accept or reject said additional card;*

*(e) if said player elects to reject said additional card, said player placing a second bet and receiving a replacement card for said rejected additional card;*

*(f) said player electing whether to take subsequent additional cards or to stand; and*

*(g) comparing said player's hand to said dealer's hand in order to determine a winner of the game according to a predetermined criterion for evaluating hands.*

*22. A method according to claim 21, wherein when said player accepts one or more additional cards and then elects to take yet another additional card, said player may then elect to reject said yet another additional card and receive a replacement therefore upon said player placing a second bet.*

*23. A method according to claims 21 or 22, wherein said first bet and said second bet are equal.*

*24. A method according to claims 21 or 22 wherein said predetermined criterion for evaluating hands is that a hand having a card count closer than any other hand to one or more fixed target values, without exceeding said fixed target values, is a winning hand.*

*25. A method according to claim 24, wherein said player is not allowed to reject an additional card if said additional card, in combination with all preceding cards dealt to said player in the hand in play, creates a card count greater than the greatest of said fixed target values.*

*26. A method according to claim 25, wherein if said player elects to receive a replacement card, said player will thereafter lose all bets made by said player in the event of a tie card count with said dealer.*

*27. A method according to claim 22, wherein when said player elects to reject an additional card and then later accepts one or more other additional cards, said player may elect to reject a second additional card and receive a replacement therefor upon said player placing a third bet.*

*28. A method according to claim 27, wherein said first bet, second bet, and third bet are all equal.*

*29. A method according to claim 21, further comprising the step of:*

*allowing said player to double said first bet after said starting cards have been dealt, and wherein if said player doubles said first bet, said player may not thereafter elect to reject any additional card.*

*30. A method according to claim 21, further comprising the step of:*

*allowing said player to split cards of said starting cards if said starting cards are all of the same count value before said player elects to take an additional card.*

*31. A method according to claim 21, wherein said dealer wins the game in the event that said dealer's card count is equal to a card count of said player, if said player has taken a replacement card.*

*32. A method according to claim 21, wherein once said player receives a first replacement card, said player may not thereafter receive any additional cards.*

* * * * *